Patented Sept. 14, 1954

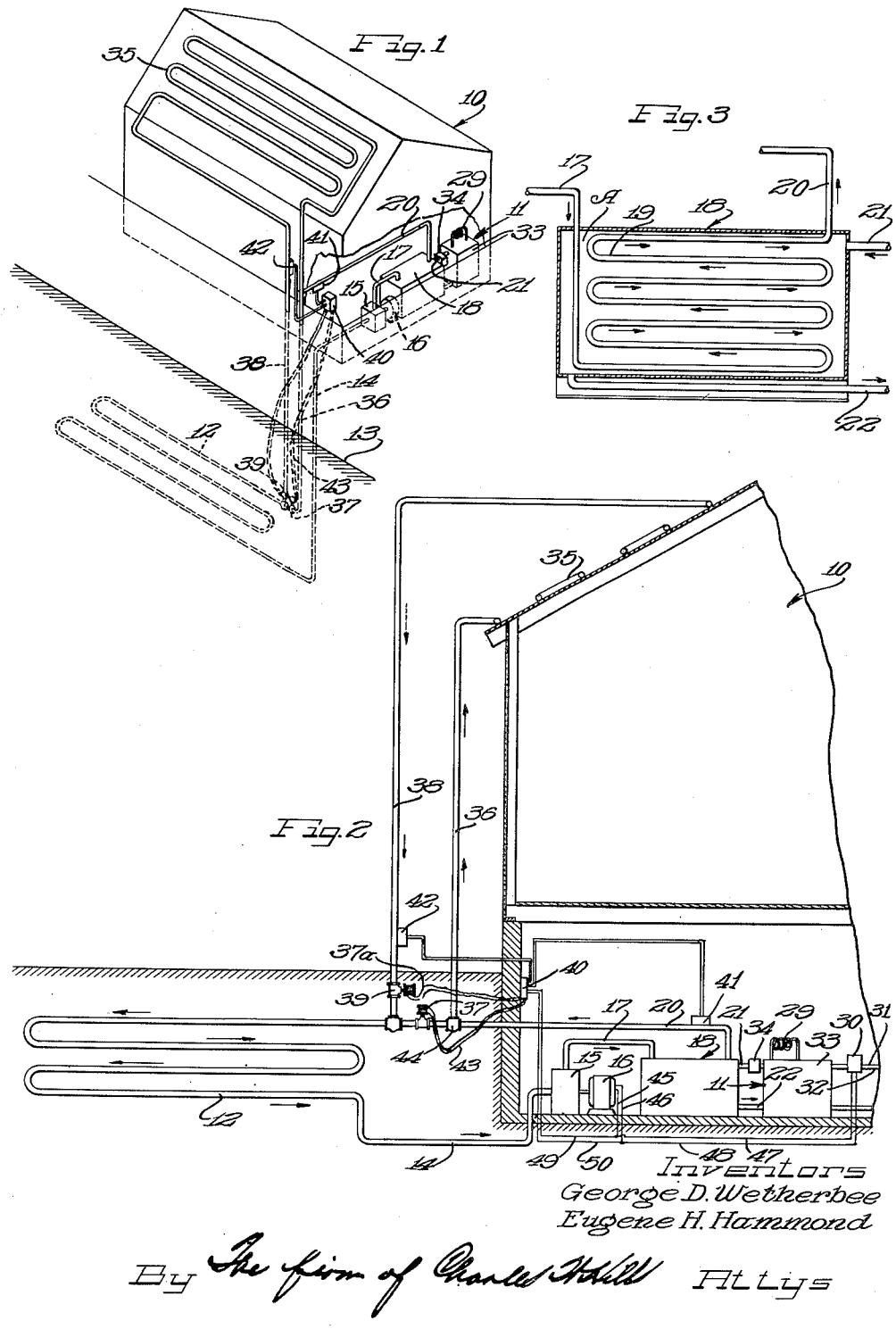

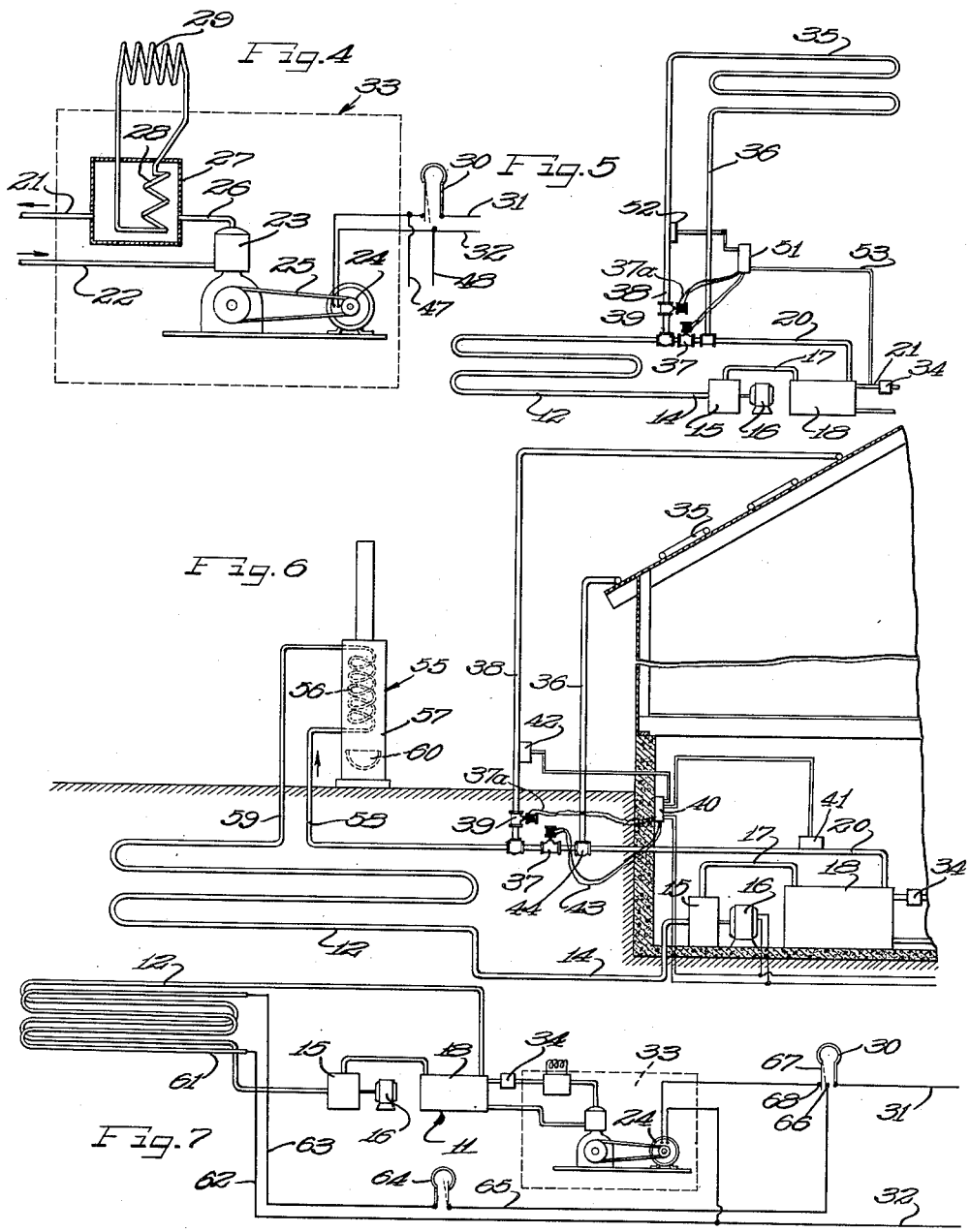

2,689,090

UNITED STATES PATENT OFFICE 2,689,090

HEATING SYSTEM

George D. Wetherbee, Chicago, and Eugene H. Hammond, Berwyn, Ill.; said Wetherbee assignor to said Hammond Application May 24, 1949, Serial No. 94,974

18 Claims. (Cl. 237—1)

The present invention relates to a heating system and method of heating, and more particularly to a heat pump or reversed cycle refrigerating system equipped with supplementary heating means for insuring the efficient operation of the heating system under all weather conditions.

This application is a continuation-in-part of our application for patent entitled "Heating System," Serial No. 794,722, filed in the United States Patent Office on December 1, 1947, now issued as Patent No. 2,529,154, dated November 7, 1950, and assigned to the assignee of the instant application.

In the above-identified, earlier filed application, we have proposed the employment of a primary heat pump, or reversed cycle refrigeration, heating system for extracting heat from a buried earth heat exchanger in conjunction with an auxiliary or secondary atmospheric heat absorber for replenishing the heat content of that soil immediately surrounding the buried heat exchanger of the primary heat pump system. In this manner, exhaustion of the heat content of the soil during a prolonged heating season is avoided because the quantity of heat extracted from the soil itself is greatly decreased.

The present invention now provides a simplified, less expensive type of heating system in which various forms of auxiliary heating means are provided for replenishing the heat content of the soil and also for direct cooperation with the heat pump unit itself. The advantages of the present invention include the provision of auxiliary heating means, such as an atmospheric heat absorber and/or combustion or electric type auxiliary heating means, for use in conjunction with, or instead of, the atmospheric heat absorber of the above-identified pending application, the employment of a single buried heat exchanger in conjunction with both the auxiliary heating means and the heat pump, and an improved type of differential thermostatic control for insuring the efficient operation of the heat system under all weather conditions to supply additional heat energy to the soil and/or to the heat pump when the earth is not an efficient heat source. In addition, the system of the present invention is particularly adapted for use with unitary or "packaged" heat pump or reversed refrigeration units.

It is, therefore, an important object of the present invention to provide an improved, simplified heating system of the heat pump type having auxiliary means for replenishing at least a portion of the heat extracted from the earth.

Another important object of the present invention is to provide a heating system including a heat exchanger disposed in the soil, a heat pump connected to the heat exchanger for extracting heat from the surrounding soil, and auxiliary heating means which may or may not be thermostatically controlled to supply heat to the soil immediately adjacent the heat exchanger to replenish at least a portion of the heat content of the soil removed by said heat pump.

Still another important object of the present invention is to provide a heating system including a heat pump for extracting heat from the soil, auxiliary heating means correlated to the heat pump for replenishing heat extracted from the soil by operation of the heat pump and thermostatic means for controlling the operation of the auxiliary heating means, the thermostatic control means permitting the replenishment of the heat content of the earth only when the auxiliary heating means is capable of transmitting heat to the earth.

Still another important object of the present invention is to provide a heating system including a heat pump for extracting heat from the soil, an atmospheric heat absorber for replenishing at least a portion of the heat extracted from the soil by operation of the heat pump and auxiliary heating means in addition to the atmospheric heat absorber to insure efficient operation of the system under extreme weather conditions.

Yet a further important object of the present invention is to provide an improved heating system including a heat pump for extracting heat from the soil, electric heating means disposed in the soil, and means for controlling the operation of electrical heating means in accordance with the operation of the heat pump.

An additional object of the present invention is to provide an improved method of heating by the extraction of heat from the soil and the supplying of additional thermal energy to augment or replenish the heat removed from the soil.

According to the features of the present invention, the auxiliary heating means of the present invention for supplementing or replenishing the heat content of the soil for later extraction by the heat pump may take several different forms. For example, an atmospheric heat absorber may be employed or, alternatively, combustion or electrical auxiliary heating means may be used either alone or in conjunction with an atmospheric heat absorber. In case electrical or combustion auxiliary heating means are employed in conjunction with an atmospheric heat absorber, such means are employed only at those times during which the atmospheric heat absorber is not capable of replenishing the heat content of the soil normally supplying heat to the heat pump. The auxiliary heating means may thus take the form of a simple combustion heater or electrical earth coil supplying heat to the soil by means of heat exchange fluid circulated through the auxiliary means or by means of an additional heat exchanger disposed within the soil to be heated.

Alternatively, the auxiliary heating means may be employed to replace the atmospheric heat absorber, in which case the auxiliary heating means may or may not be provided with a thermostatic control correlated to the operation of the pump itself.

In our Patent 2,529,154, issued November 7, 1950, we proposed the employment of a pair of buried heat exchangers, one of which was connected to the heat pump system and the second of which was connected to the atmospheric heat absorber. In one modification of the device of the present invention, only one buried heat exchanger is employed, the heat exchanger being disposed in heating relation to both the heat pump and the atmospheric heat absorber. In this manner, the expense of the additional heat exchanger has been eliminated and a simplified control system is possible.

The present invention, as hereinbefore stated, also provides an additional alternative feature, namely, an improved differential thermostatic control for insuring the efficient operation of the heating system. This thermostatic control regulates the operation of the atmospheric heat exchanger, or of the other auxiliary heating means, so that efficient replenishment of the heat content of the soil is obtained with heat being extracted from the auxiliary heating means only when such means is capable of supplying heat to the soil.

Other and further important objects and features of this invention will be apparent from the disclosure in the specification and the accompanying drawings.

On the drawings:

Figure 1 is a somewhat schematic, perspective, elevational view, with parts broken away, of a building equipped with a heating system of the present invention;

Figure 2 is a vertical sectional view of the building of Figure 1 illustrating the heating system of the present invention in greater detail;

Figure 3 is a vertical, sectional view, with parts shown in elevation, of a portion of the heating system of Figures 1 and 2;

Figure 4 is a fragmentary, sectional view, with parts shown in elevation, illustrating a different portion of the heating system of Figure 1;

Figure 5 is a fragmentary, schematic view illustrating a heating system similar to that of Figures 1 and 2 equipped with a modified form of thermostatic control;

Figure 6 is a fragmentary, sectional view similar to Figure 2 illustrating a modified heating system of the present invention; and Figure 7 is a fragmentary, schematic view illustrating an additional modified heating system of the present invention.

As shown on the drawings:

In Figure 1, reference numeral 10 refers generally to a building of simplified construction equipped with a heating system of the present invention.

The heating system of the present invention includes a heat pump or reversed cycle refrigerating system 11 comprising a coil-type heat exchanger 12 disposed beneath the surface 13 of the earth outside the confines of the building 10. The outlet side 14 of the coil 12 communicates with a pump 15 driven by a motor 16. An outlet line 17 from pump 15 leads into an evaporator 18, more particularly shown in Figure 3. Evaporator 18 can be any type of refrigerant to fluid heat exchanger and not necessarily of the type shown in Figure 3.

The evaporator 18 defines an interior space A containing a coil 19 connected to the pump outlet line 17. A coil outlet line 20 constitutes the inlet line for the heat exchanger coil 12. The coil 12 is preferably filled with suitable heat exchange fluid, such as brine, which is thus circulated through the evaporator 18 by the pump 15.

The interior of the evaporator 18, namely, the space A, is filled with a body of fluid refrigerant, such as dichlorodifluoro methane, trichloromonofluoro methane, trichlorotrifluoro methane, or like material. Ingress and egress of refrigerant into and out of the space A is provided by an inlet line 21 and outlet line 22, respectively.

The outlet line 22 of the evaporator 18 leads to a compressor 23 (Figure 4) having a driving motor 24 operatively connected to the compressor 23, as by means of a power transmission belt or chain 25 or other type of connection. The compressor outlet line 26 conducts refrigerant from the compressor 23 to a heating or condensing chamber 27 provided with an interior heat exchange coil 28 in flow communication with an exterior heat exchanger coil 29 disposed within the housing in the building 10. An exit from the heating chamber 27 is provided by the refrigerant inlet line 21 of the evaporator 18. Or air may pass over a condensing coil equivalent to a conventional air cooled condenser.

The operation of the compressor 23 is controlled by a thermostat 30 located in one of the current supply lines 31 and 32 of the motor 24 to operate a magnetic starter or the like. The heater 27, the compressor 23, the motor 24 and the thermostatic control 30, together with the necessary piping and other fixtures, constitute a conventional heat pump, or reversed cycle refrigerating, unit indicated generally at 33 (Figures 1, 2 and 4).

An expansion valve or other pressure reducing device 34 (shown only diagrammatically in Figures 1 and 2) is interposed in the line 21 and includes a conventional fluid flow obstructing element capable of opposing the flow of fluid so that the pressure in the evaporator 18 is maintained at a value less than that in the heating chamber 27, the valve thus exerting a throttling action upon the fluid pressure prior to its introduction into the evaporator.

An auxiliary heating means is provided for operation in conjunction with the heat pump hereinbefore described. The auxiliary heating means includes an atmospheric heat absorber coil 35 disposed externally of the building 10 and is illustrated in Figure 1 as disposed upon the roof of the building. The atmospheric heat absorber 35 contains a fluid heat exchange medium, such as brine, and communicates with the heat exchange coil 12 of the heat pump through an absorber inlet line 36 communicating through fitting 44 with the outlet line 20 leading from the evaporator 18 to the coil 12. An absorber outlet line 38 communicates with the line 20 of the coil 12 and is controlled by a solenoid-controlled fluid valve 39. An additional solenoid-operated valve 37 is provided in line 20 between the fitting 44 and the valve 39. Obviously, valves 37 and 39 can be placed at other points than shown to produce the same results.

In order to obtain selective series flow circulation through the absorber 35 and the coil 12, the operation of the solenoid-controlled valves 39 and 37 is regulated by a differential thermostat indicated generally at 40. The temperature bulbs 41 and 42 of the differential thermostat 40 are disposed in thermal communication with the outlet line 20 and the absorber outlet line 38, respectively. The bulb 42 is preferably attached to a portion of the outlet line 38 exposed to the atmosphere and will tend to approach atmospheric temperature when no fluid flows through the outlet line 38. The bulb 41, of course, partakes of the temperature of the fluid after it leaves the evaporator 18, which temperature is a function of the heat potential of the earth reservoir surrounding the coil 12. It will be apparent, therefore, that the bulbs 41 and 42 measure the thermal energy differential between the atmosphere and the earth since the atmosphere acts as a thermal reservoir for the absorber 35 and the earth acts as a thermal reservoir for the coil 12. Pairs of conductors 43 and 37a connect the thermostat 40 to the motors of the valves 37 and 39, respectively.

It will readily be seen that upon the establishing of flow through the valve 39 and the interruption of flow through valve 37, by operation of the thermostat 40, heat exchange fluid from the atmospheric heat absorber 35 will flow in series through the coil 12. The thermostat 40 is so constructed that flow through the valve 39 will be established at any time when bulb 42 is warmer than bulb 41, or, in other words, when heat can be supplied to the fluid from the heat absorber 35 so that the heat exchange medium passing therethrough leaves the heat absorber at a higher temperature than it enters the same. At such times, heat absorber 35 is performing a useful purpose.

Upon the opening of the valve 39 and closing of valve 37, fluid will be pumped through the heat absorber 35 by the pump 15 with the fluid passing in series through both the earth coil 12 and the absorber coil 35.

The lead-in lines 45 and 46 (Figure 2) of the motor 16 are connected to a suitable source of power, such as power lines 31 and 32, through conductors 47 and 48 and building thermostat 30 to operate the motor 16 and the pump 15 at all times when the motor 24 is being operated and heat is being furnished by the heat pump compressor 23. Also, the lines 47 and 48 are connected to lines 49 and 50, respectively, from the thermostat 40 to operate the motor 16 when the valve 39 is opened and valve 37 closed and heat is being obtained from the atmospheric heat absorber 35 regardless of whether or not there is a demand for heat in building 10, thus storing heat in the earth for future extraction by the heat pump.

The operation of the embodiment of the invention illustrated in Figures 1–4 of the drawings is as follows:

It is obvious that upon the closing of the thermostat 30, the motor 24 will be energized to operate the compressor 23 and the motor 16 will be energized to operate the pump 15. Thus, heat exchange fluid will be circulated through the soil heat exchanger coil 12 into the evaporator 18 to heat refrigerant contained therein. This refrigerant is introduced through line 22 into the compressor 23 where it is compressed for introduction through line 26 into the heater 27. Heat from the heater 27 is introduced into the interior of the building 10 through the heat exchanger 29 or by air passing over a condenser coil. Refrigerant from the heater 27 is introduced through expansion valve 34 back into the evaporator 18. In this manner, heat energy is extracted from the soil and introduced into the interior of building 10. It will be appreciated that the heat exchanger 29 is merely representative and that any type of heat conveying means may be disposed within the building 10 for conducting heat to the space to be heated.

It has been found in the operation of a heat pump installation such as that hereinbefore described that such a large amount of heat may be extracted from the soil during a prolonged heating season so as to seriously interfere with the efficiency of the heat pump unit. The auxiliary heating means of the present invention replenishes the heat content of the soil so that such a depletion of heat energy does not occur even during prolonged heating periods in severe weather. The differential thermostat 40 and the bulbs 41 and 42 are so arranged that the valve 39 is opened when a heat advantage is to be obtained from the heat absorber 35. The valve 37 is closed and the heat exchange fluid is circulated in series through the heat absorber coil 35 and the ground coil 12. It will be noted that heat exchange fluid from the evaporator is initially introduced into the atmosphere heat absorber 35 and then into the ground coil 12. Thus, if the temperature of the atmosphere is greater than or substantially equal to the temperature of the soil, heat is extracted from the atmosphere rather than from the soil. This preferential absorption of atmospheric heat conserves the heat content of the soil for subsequent extraction when the atmosphere is not a favorable source of heat. In this manner, atmospheric heat energy is introduced into the heat exchange fluid to augment that heat subsequently removed from the soil by operation of the heat pump. Although the sequence of circulation is shown in a certain order, it may be that in some instances a different sequence would be desirable.

It will be seen that circulation through the heat absorber unit 35 will not interfere with the extraction of heat from the soil by the heat exchange coil 12 of the heat pump cycle. Accordingly, the heat pump may be operated concurrently with the atmospheric heat absorber with that heat energy absorbed from the atmosphere being added to that extracted from the soil to add to the efficiency of the heat pump operation.

Alternatively, it is possible to operate the heat absorber unit 35 independently of the operation of the heat pump unit, thus storing in the soil surrounding the ground coil 12 a quantity of heat from the atmosphere to be later extracted from the soil by operation of the heat pump.

A modified form of differential thermostat for correlating the operation of the atmospheric heat absorber 35 and the heat pump is shown in Figure 5 of the drawings. This modified thermostat is indicated by reference numeral 51, the thermostat 51 being capable of operating upon a pressure-temperature differential. A temperature-sensitive bulb 52 of the thermostat 51 is connected to the outlet line 38 of the heat absorber unit 35 while the pressure-sensitive mechanism of the thermostat 51 is connected through line 53 to line 21 for conveying refrigerant from the expansion valve 34 to the evaporator 18. Alternatively, the pressure-sensitive mechanism may be connected to the evaporator 18 or to any other point on the low pressure side of the refrigerant system. Since the correlation between temperature and pressure of any refrigerant has been accurately determined, it may be seen that the valve 39 is thus controlled by the thermostat 51 to open and valve 37 to close whenever the temperature within the evaporator 18 is less than the temperature in line 38. In this manner, the operation of the heat absorber unit 35 may be correlated with the operation of the heat pump as hereinbefore described in connection with the first embodiment of the present invention.

The embodiment of the present invention illustrated in Figure 6 of the drawings is substantially identical with that hereinbefore described in connection with Figures 1-4, inclusive. However, it will be noted in Figure 6 that an additional auxiliary type heating means 55 is provided for use in extremely prolonged cold weather when the heat content of the soil surrounding the coil 12 cannot be adequately replenished by means of the atmospheric heat absorber coil 35 as hereinbefore explained.

The additional supplementary heating means includes a heat exchange coil 56 disposed within a casing 57, the coil being connected, through inlet line 58 and outlet line 59, in series with the coil 12. A burner element 60 is disposed within the casing 57 in proximity to the coil 58 to provide heat to raise the heat exchange fluid passing through the coil 56 to a higher temperature. The supplementary heating means 55 may be any type of heater such as those employing combustible fuels, such as oil, natural or manufactured gas, gasoline, and the like, or it may be an electrical resistance unit. If desired, the supplementary heating means 55 may be provided with thermostatic controls for regulating the operation of the unit 55 in accordance with the operation of the atmospheric heat absorber coil 35 and the heat pump unit. However, use of the supplementary means 55 is contemplated for only a short period of time to provide an economical, readily available means for adequately heating the building 10 during extremely cold periods of infrequent occurrence. In such a case, thermostatic controls would not be necessary nor would their expense be justified. Supplementary heating means 55 could be used either with or without atmospheric heat absorber.

In Figure 7, a heat pump unit 11 is provided with a coil 12 which is disposed within the soil as hereinbefore indicated. The supplementary heating means of this embodiment of the invention includes a buried first coil 61 of the electrical resistance heating type. Such resistance heating coils are well known in the art and may suitably comprise a conductor embedded in a jacket of lead or the like. The inside of the coil 61 is connected through a conductor 62 to a lead line 32 for the heat pump motor 24. The other side of the coil 61 is provided with a conductor 63 connected to one side of a thermostat 64 having its other side connected to a lead line 65. The line 65 is connected to a middle terminal 66 of the motor control thermostat 30 for the motor 24. The thermostat 30, as hereinbefore described, is disposed within the building 10 and controls the energization of the heat pump by controlling operation of the motor 24. Inasmuch as the terminal 63 of the thermostat 30 is never contacted by the movable thermostat element 67 while the motor terminal 68 is contacted, it may be seen that the coil 61 and the motor 24 never operate at the same time. The thermostat 64 may be suitably controlled by any temperature within either the brine system, including the earth coil 12, the pump 15, the evaporator 18 and the connecting piping, or the refrigerant system including the evaporator 18, the compressor unit 33 and the connecting piping. Thus, the thermostat 30 prevents the simultaneous energization of the motor 24 and the coil 61 to avoid the imposition of an excessive peak load upon the electrical supply line 31—32 while the thermostat 64 controls the energization of the coil 61 so that it draws current only when needed to replenish the heat content of the soil within which the heat exchanger 12 is located. Obviously other electrical hook-ups than the above could be utilized to accomplish the same result.

Although the present invention has been described with particular reference to the heating of an enclosed space, it will be appreciated that the heating system is capable of wide application and may be employed for the heating of sidewalks, roadways, bridges, and the like.

It will be appreciated that the system of the present invention may be readily adapted to a cooling cycle. The thermostatic control may be readily reversed to extract heat from the enclosed space and to dissipate this heat to the earth and/or the atmosphere. The evaporator 18 would thus serve as a condenser and the heat exchanger 12 and the absorber unit 35 would dissipate heat rather than absorb it. In this manner, the system may be employed as a year-round air conditioning system.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. A heating system for an enclosed space comprising, in combination, a first heat exchanged disposed in the soil outside said space, means for circulating a heat exchange fluid through said first head exchanger to extract thermal energy from the soil surrounding said first heat exchanger, a reverse cycle refrigeration unit contaiing a body of refrigerant and adapted to supply to said space heat energy extracted from the soil by said heat exchanger, an atmospheric heat absorber unit in fluid flow communication with said fluid circulating means and said heat exchanger for receiving fluid prior to its passage through said heat exchanger, and means for establishing the flow of heat exchange fluid through said heat absorber unit and thence to said heat exchanger only when the atmosphere is capable of serving as an efficient source of heat, said means including a pressure-temperature sensitive thermostat subjected to the temperature of heat exchange fluid in said heat absorber and the pressure of refrigerant within said refrigeration unit.

2. A heating system for an enclosed space comprising, in combination, a soil-type heat pump unit for extracting thermal energy from the soil and supplying this energy to the enclosed space, an atmospheric heat absorber, means for supplying thermal energy from said absorber to said heat pump unit, thermostatic means for initiating operation of said atmospheric heat absorber whenever the atmosphere is capable of serving as an efficient heating medium, and auxiliary heating means for augmenting thermal energy extracted by said heat pump unit when the atmosphere is not an efficient heat source.

3. A heating system for an enclosed space comprising, in combination, a first heat exchanger disposed in the soil outside said space, means for circulating a heat exchange fluid through said first heat exchanger to extract thermal energy from the soil surrounding said first heat exchanger, means disposed within said space for supplying to the space the heat energy extracted from the soil by said first heat exchanger, a second heat exchanger exposed to the atmosphere outside said space and in fluid flow communicating with said fluid circulating means and said first heat exchanger, means for establishing series fluid flow between said first and second heat exchangers whenever the atmosphere is capable of serving as an efficient heat source, and auxiliary heating means in fluid flow communication with said first heat exchanger for augmenting heat energy extracted from the soil by said first heat exchanger when the atmosphere is not capable of serving as an efficient heat source.

4. A heat system for an enclosed space comprising a soil-type pump unit for extracting thermal energy from the soil and supplying this energy to the closed space, an electrical heat exchanger for supplying thermal energy to the soil to replace at least a portion of the thermal energy extracted therefrom by said pump, and means for correlating the operation of said heat pump and said electrical heat exchanger.

5. A heating system for an enclosed space comprising, in combination, a soil-type heat pump unit for extracting thermal energy from the soil and supplying this energy to an enclosed space, an electrical heat exchanger disposed in the soil to replace at least a portion of the thermal energy extracted therefrom by said pump, and thermostatic means for controlling the operation of said electrical heat exchanger and preventing the concurrent operation of said heat pump and said heat exchanger.

6. A heating system for an enclosed space comprising, in combination, a first heat exchanger disposed in the soil outside of said space, means for circulating a heat exchange fluid through said first heat exchanger to extract thermal energy from the soil surrounding said first heat exchanger, means disposed within said space for supplying to the space the heat energy extracted from the soil by said first heat exchanger, an electrical heat exchanger disposed in the soil adjacent said first heat exchanger in thermal proximity thereto, and thermostatic means for controlling the energization of said electrical heat exchanger to replace at least a portion of the withdrawn soil heat content when necessary and to prevent the concurrent operation of said fluid circulating means and said electrical heat exchanger.

7. A heating system for an enclosed space comprising, in combination, a heat exchanger disposed in the soil outside of said space, means for circulating a heat exchange fluid through said heat exchanger to extract thermal energy from the soil surrounding said heat exchanger, heat exchange means disposed within said space for supplying to said space the heat energy extracted from the soil by the circulation of said fluid within said heat exchanger, auxiliary heating means for supplying additional heat to said heat exchange fluid, and control means responsive to the thermal energy differential between said auxiliary heating means and the soil to regulate the addition of heat to the heat exchange fluid whenever the auxiliary heating means is a better source of heat than the heat exchanger.

8. A heating system comprising a soil-type heat pump unit, means including an earth heat absorber for circulating a heat exchange fluid through said heat pump unit for extracting thermal energy from the soil and supplying this energy to an area to be heated, an atmospheric heat absorber, circulating means for directing said heat exchange fluid in series through said heat pump unit and through both of said absorbers to supply thermal energy from said atmospheric heat absorber to said heat pump unit to replenish heat extracted from the soil by said earth heat absorber, and a differential thermostatic control means selectively by-passing said atmospheric heat absorber in response to variations in the thermal energy gradient between the atmosphere and the soil.

9. In a heating apparatus, an enclosure, a heat pump having a thermal reservoir, and an air coil exposed to the atmosphere outside of the enclosure, a fluid medium circulating through said heat pump unit, said heat pump unit including means to extract thermal energy from the fluid medium and to supply the extracted thermal energy to the enclosure, control means to selectively circulate the spent fluid medium through said air coil to absorb thermal energy from the atmosphere, and means to circulate the spent medium through said thermal reservoir to absorb thermal energy from said reservoir, said control means including elements responsive to variations in a thermal energy differential between the thermal reservoir and the atmosphere to circulate said fluid medium through said air coil only when such circulation will replenish thermal energy to the thermal reservoir.

10. In a heat pump heating system, a heat pump unit including fluid duct connections forming a closed fluid circuit and having a thermal reservoir including a reservoir coil in the circuit to extract thermal energy from said thermal reservoir, an atmospheric coil to extract thermal energy from the atmosphere, conduit connecting means between said atmospheric coil and the circuit for carrying a heat pump fluid medium through said reservoir coil and said atmospheric coil, and a control device in said conduit connecting means to selectively direct said heat pump fluid medium through only said reservoir coil or in series through said atmospheric coil and said reservoir coil.

11. In a heat pump heating system as defined in claim 10, said control device having elements responsive to variations in the thermal energy differential between the thermal reservoir and the atmosphere, thereby to regulate the selective direction of said heat pump fluid medium in response to such variations.

12. In a heating system for heating an enclosed space, comprising, a first heat exchanger disposed in a first thermal reservoir, means for circulating a heat exchange fluid through said first heat exchanger to extract thermal energy from said first thermal reservoir, means disposed within said space for supplying to the space heat energy extracted from said first thermal reservoir by said first heat exchanger, a second heat exchanger disposed in a second thermal reservoir, and control means selectively establishing series flow of said fluid through said second heat exchanger and said first heat exchanger to impart additional heat energy to said fluid prior to its circulation through said first heat exchanger whenever the second thermal reservoir is a better source of heat than the first thermal reservoir.

13. In a heating system as defined in claim 12, said second heat exchanger comprising an atmospheric heat exchanger and said second thermal reservoir comprising the atmosphere to impart additional thermal energy from the atmosphere to said fluid.

14. In a heating system as defined in claim 13, said first thermal reservoir comprising a subterranean mass of earth.

15. In a heating system as defined in claim 12, said second heat absorber comprising an auxiliary heat exchanger, said second thermal reservoir comprising heat generating elements, whereby separately generated thermal energy is selectively added to said fluid.

16. In a heating system as defined in claim 12, said first thermal reservoir comprising a subterranean mass of earth.

17. A heating system as defined in claim 12, said control means comprising flow control apparatus arranged to selectively direct the flow of heat exchange fluid in series through the second heat exchanger, and thermostatic means in control of said flow control apparatus responsive to variations in a selected temperature gradient.

18. A heating system as defined in claim 17, said flow control apparatus comprising conduit means having motor-actuated valves in control thereof to selectively direct the flow of the heat exchange fluid to the second heat exchanger.

References Cited in the file of this patent

UNITED STATES PATENTS

| Number | Name | Date |
|---|---|---|
| 1,683,434 | Altenkirch | Sept. 4, 1928 |
| 1,969,187 | Schutt | Aug. 7, 1934 |
| 2,071,178 | Roessler | Feb. 16, 1937 |
| 2,242,588 | McGrath | May 20, 1941 |
| 2,396,338 | Newton | Mar. 12, 1946 |
| 2,529,154 | Hammond | Nov. 7, 1950 |
| 2,575,478 | Wilson | Nov. 20, 1951 |

FOREIGN PATENTS

| Number | Country | Date |
|---|---|---|
| 59,350 | Switzerland | Feb. 13, 1912 |

OTHER REFERENCES

"House Heating with Earth Heat Pump," by A. C. Crandall in November 9, 1946 issue of Electrical World, pp. 94 and 95.